(12) United States Patent
Tanaka et al.

(10) Patent No.: US 6,469,252 B1
(45) Date of Patent: Oct. 22, 2002

(54) FLAT CABLE

(75) Inventors: Yoshiyuki Tanaka, Shizuoka-ken (JP); Tomoyoshi Kikkawa, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/686,367

(22) Filed: Oct. 12, 2000

(30) Foreign Application Priority Data

Nov. 5, 1999 (JP) .......................................... 11-315976

(51) Int. Cl.⁷ .................................................. H01B 7/08
(52) U.S. Cl. .................................................... 174/117 F
(58) Field of Search ..................... 174/117 F, 117 FF, 174/250

(56) References Cited

U.S. PATENT DOCUMENTS

| | | | |
|---|---|---|---|
| 3,764,727 A | * 10/1973 | Balde | 174/117 FF X |
| 4,490,690 A | * 12/1984 | Suzuki | 174/117 FF X |
| 4,578,529 A | * 3/1986 | Look | 174/117 FF |
| 5,003,273 A | * 3/1991 | Oppenberg | 174/117 FF X |
| 6,218,622 B1 | * 4/2001 | Rimmer | 174/117 FF |

FOREIGN PATENT DOCUMENTS

| | | |
|---|---|---|
| JP | 63-70684 | 5/1988 |
| JP | 1-148687 | 10/1989 |

* cited by examiner

*Primary Examiner*—Chau N. Nguyen
(74) *Attorney, Agent, or Firm*—Finnegan, Henderson, Farabow, Garrett & Dunner, L.L.P.

(57) ABSTRACT

A flat cable for electrically connecting a fixed body and a rotating body which can be freely rotated coaxially to this fixed body is disclosed. The flat cable includes a first insulating film on which a first set of separate plated conductor strips is disposed, and a second insulating film on which a second set of separate plated conductor strips is disposed. The first and second sets of separate plated conductor strips are sandwiched between the first and second insulating films to form multiple layers. The first set of separate plated conductor strips on the first insulating film and the second set of separate plated conductor strips on the second insulating film are layered to be electrically separated from each other.

2 Claims, 7 Drawing Sheets

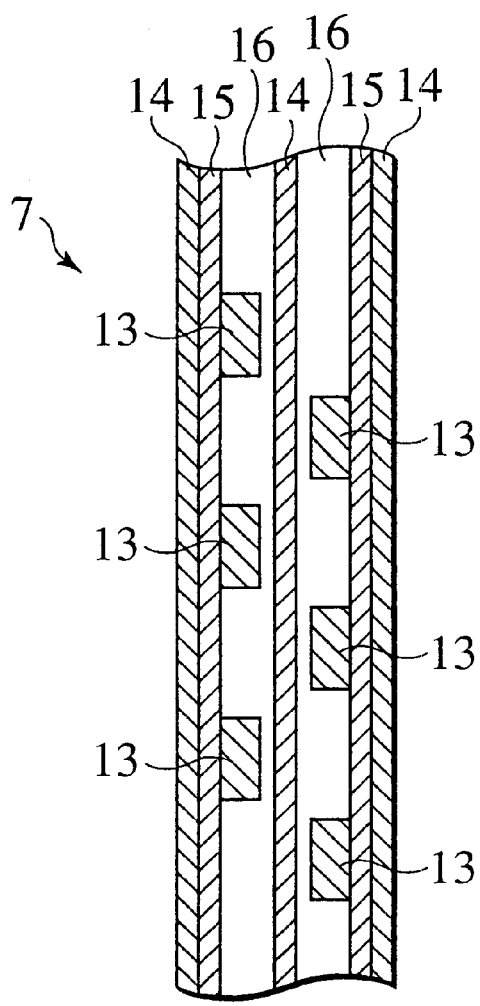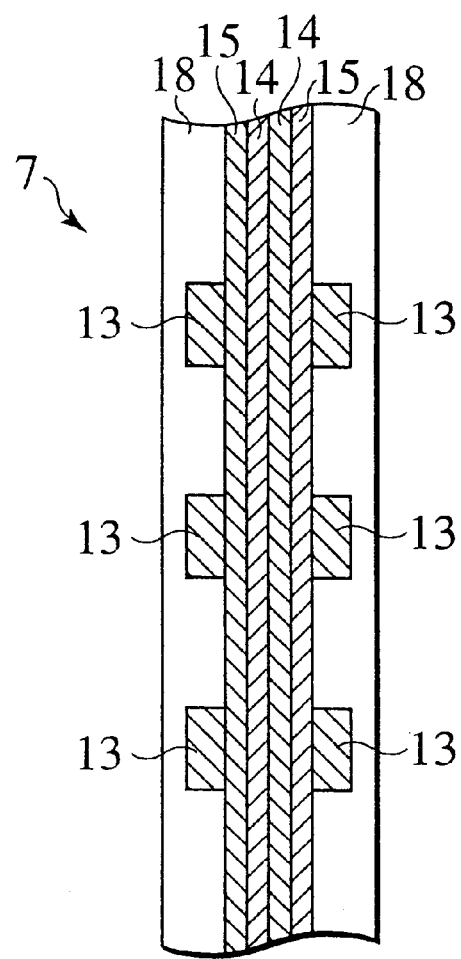

FLAT CABLE

BACKGROUND OF THE INVENTION

1. Field of the Invention

The present invention relates to a flat cable for electrically connecting a fixed body and a rotating body which can be freely rotated coaxially to this fixed body.

2. Description of the Prior Art

For example, in a steering installation in an automobile or the like, a flat cable comprising plural conductor strips sandwiched between polyethylene terephthalate sheets or the like is spirally put into a space made between a rotating body fitted to a steering wheel and a fixed body fitted to a bearing of a steering shaft. An electrically connecting device having a structure wherein the rotating body and the fixed body are electrically connected (for example, in an air bag circuit) by means of the above-mentioned flat cable is fitted up to the steering installation.

Incidentally, in the electrical connecting device, the space around the steering wheel for accommodating the flat cable is limited. The width of the flat cable is also limited. For this reason, if the number of necessary circuits becomes larger than the number of the conductor strips in the flat cable, it is necessary to increase the number of the conductor strips by some other methods.

Thus, as the means for solving the above-mentioned problem, there is suggested, for example, a means disclosed in Japanese Utility Model Application. Laid Open No. 63-70684. As shown in FIG. 1, in this means the number of conductor strips is increased by winding plural flat cables 103 into layers. In each of the cables 103, plural conductor strips 101, made of copper foil or the like, are put between base films 102 made of polyethylene terephthalate (PET) or the like, so as to be integrated.

However, when the flat cables 103 are wound into layers, the flat cables 103 move freely inside the above-mentioned space. Therefore, base films 102 on the flat cables 103 may be worn away by friction between the cables 103. If the degree of the wear is considerable, a risk that the conductor strips 101 are bared so as to be short-circuited is incurred.

As shown in FIGS. 2 and 3, Japanese Utility Model Application, Laid Open No. 1-148687 also suggests a flat cable 103 in which plural conductor strips 101 are disposed onto the front and back surfaces of an inside base film 102 and then this inside base film 102 is sandwiched between outside base films 102 so as to be bonded and integrated thereto from upper and lower directions, thereby increasing the number of the conductor strips.

However, in the flat cable 103 having the above-mentioned structure, the conductor strips 101, made of rolled copper foil (having poor flexibility) or the like, are sandwiched between the base films 102, using an adhesive agent. The flat cable 103 is wound in a roll-to-roll manner, and cut. In this way, the flat cable 103 is produced. Therefore, circuits made by the conductor strips 101 become linear. The shape of the circuits is much limited. Moreover, the cable 103 has only poor flexibility.

Therefore, as shown in, for example, FIG. 4A, in order to connect the flat cable 103 to an external harness, it is necessary to use buss bars 104 having a wider pitch than the arranged pitch of the conductor strips 101 so as to connect the cable 103 to a partner connector. Alternatively, as shown in FIG. 4B, it is necessary to use "L"-shaped buss bars 104'.

As described above, the prior art has difficulties in realization of a multi-circuit and in production of a circuit having a complicated shape.

SUMMARY OF THE INVENTION

Thus, an object of the present invention is to provide a highly reliable flat cable making it possible to keep electric insulation, realize a multi-circuit, produce a circuit having a complicated shape and make its thickness thin.

To achieve the object, according to a first aspect of the present invention, there is provided a flat cable for electrically connecting a fixed body and a rotating body which can be freely rotated coaxially to this fixed body, comprising: a first insulating film on which plural conductor strips which are formed by plating and etching processes are disposed; and a second insulating film on which plural conductor strips which are formed by plating and etching processes are disposed; wherein the conductor strips are sandwiched between the first and second insulating films so as to be made multilayer; and the conductor strips disposed on the first insulating film and the conductor strips disposed on the second insulating film are layered so as not to be electrically connected to each other.

In the flat cable of the first aspect, the conductor strips are formed by the plating and etching processes, and the conductor strips are put together in two or more layers. The layered conductor strips are sandwiched between the insulating films so as to be made multilayered. Therefore, as compared with flat cables having a structure wherein rolled copper foil is merely sandwiched between base films, the shape of the conductor strips can be more freely varied and can be made more complicated in the present invention. Moreover, the flexibility thereof is as good as flexible printed-wiring boards.

According to a second aspect of the present invention, there is provided a flat cable for electrically connecting a fixed body and a rotating body which can be freely rotated coaxially to this fixed body, comprising: an insulating film being provided with plural conductor strips formed by plating and etching processes on each of front and back surfaces thereof; and a solder resist being screen-printed so as to cover the conductor strips.

In the flat cable of the second aspect, the solder resist is screen-printed to cover the conductor strips. As a result, the thickness of the cable itself can be made thin. Moreover, the conductor strips can be freely changed into various shapes and can be made into complicated shapes since the conductor strips are formed by the plating and etching processes.

According to a third aspect of the present invention, as it depends from the first or the second aspect, wherein at least one end portion of each of the conductor strips is bent.

In the flat cable of the third aspect, by bending the end portions of the conductor strips, the flat cable can be directly connected to a partner connector or the like without use of buss bars made into an "L"-shaped form or the like form.

According to a fourth aspect of the present invention, as it depends from one aspect among the first aspect to the third aspect, wherein the interval between the arranged conductor strips in the bent end portion is wider than the interval between the arranged conductor strips in the other portions in the flat cable.

In the flat cable of the fourth aspect, the conductor strips can be freely made into any shape. Therefore, by making the interval between the arranged conductor strips in the bent end portions wider than that in the other portions, no buss bars become necessary. It is also possible to make the width of a flexible mobile portion accommodated in a restricted space narrow and make the width of an external terminal connecting portion wide.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 9 is a sectional view taken on line IX—IX of FIG. 7; and

FIG. 10 is a sectional view of another example of the flat cable of the present invention.

DETAILED DESCRIPTION OF PREFERRED EMBODIMENTS

Figure 1:
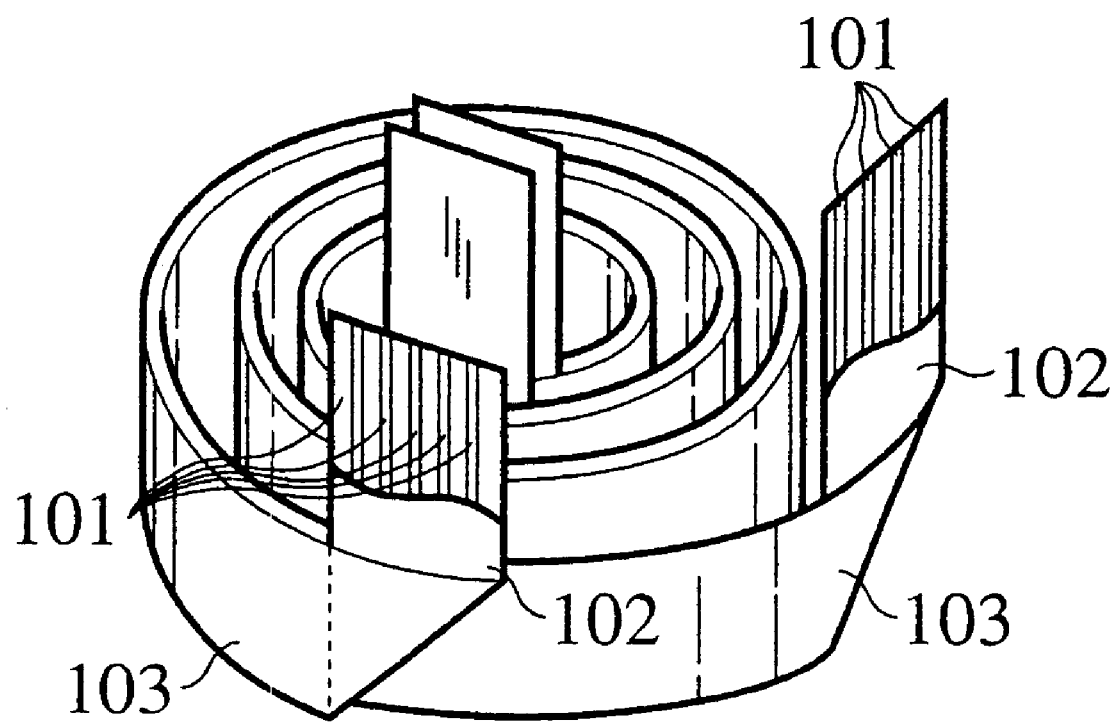
FIG. 1 is a perspective view of a conventional flat cable.
Figure 2:
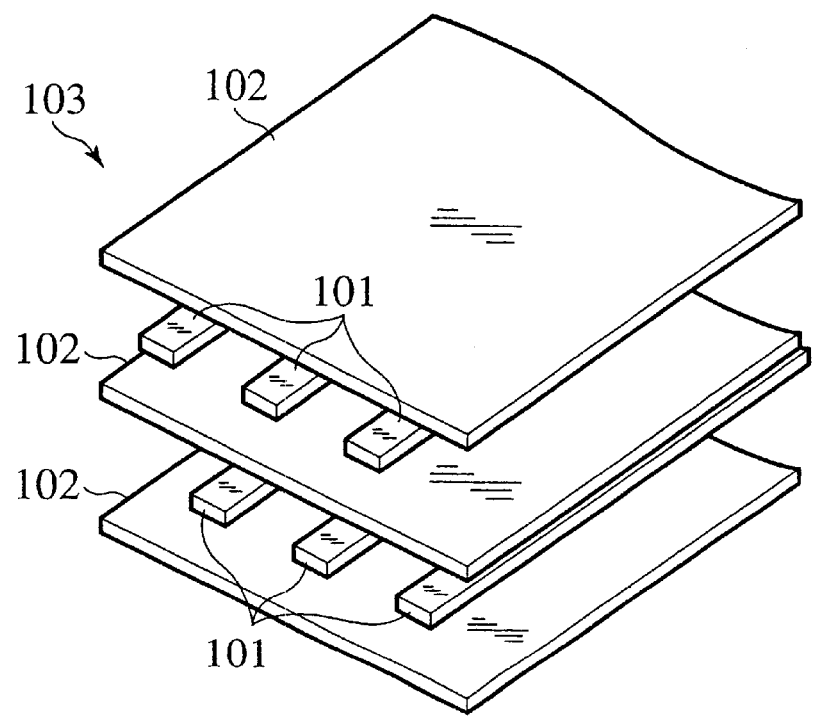
FIG. 2 is an exploded perspective view of the conventional flat cable.
Figure 3:
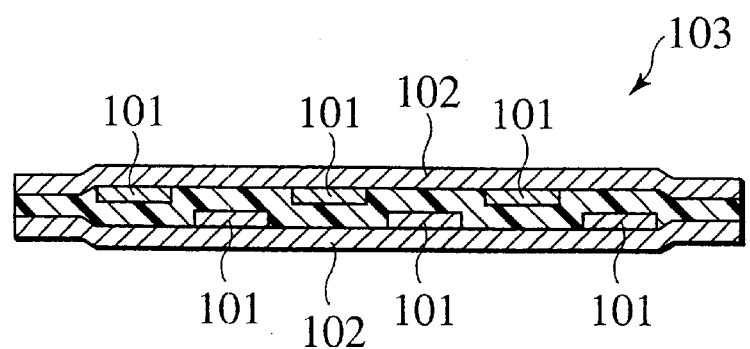
FIG. 3 is a sectional view of the flat cable shown in FIG. 2.
Figure 4A:
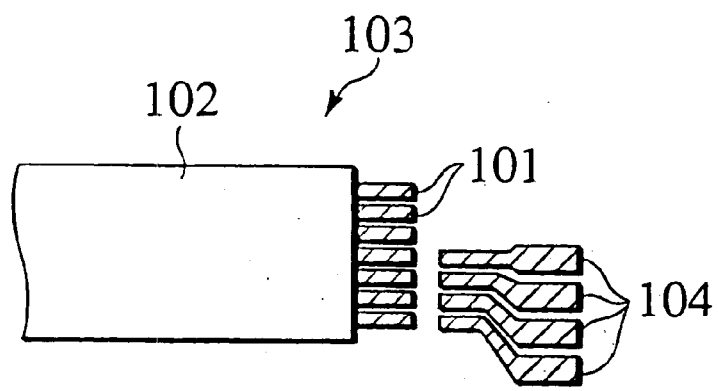
FIGS. 4A and 4B are plan views of a conventional flat cable, and buss bars connected to ends of conductor strips of the flat cable, respectively.
Figure 4B:
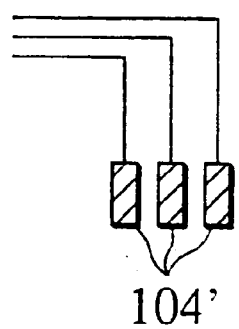

There will be detailed below the preferred embodiments of the present invention with reference to the accompanying drawings. Like members are designated by like reference characters.

In the present invention, plural conductor strips produced by plating and etching processes are put together in two or more layers so that the conductor strips in the respective layers are not electrically connected to each other, and the layered conductor strips are sandwiched between insulating films to be made multilayer. In this way, the thickness of the cable is made thin while insulation is kept. Moreover, a multi-circuit can be realized and the cable can cope with complicated shapes.

A first embodiment of a flat cable to which the present invention is applied will be described hereinafter. The present embodiment is an embodiment in which a flat cable of the present invention is applied to an electrical connecting device mounted on a steering device of an automobile or the like.

<Structure of the Electrically Connecting Device>

Figure 5:
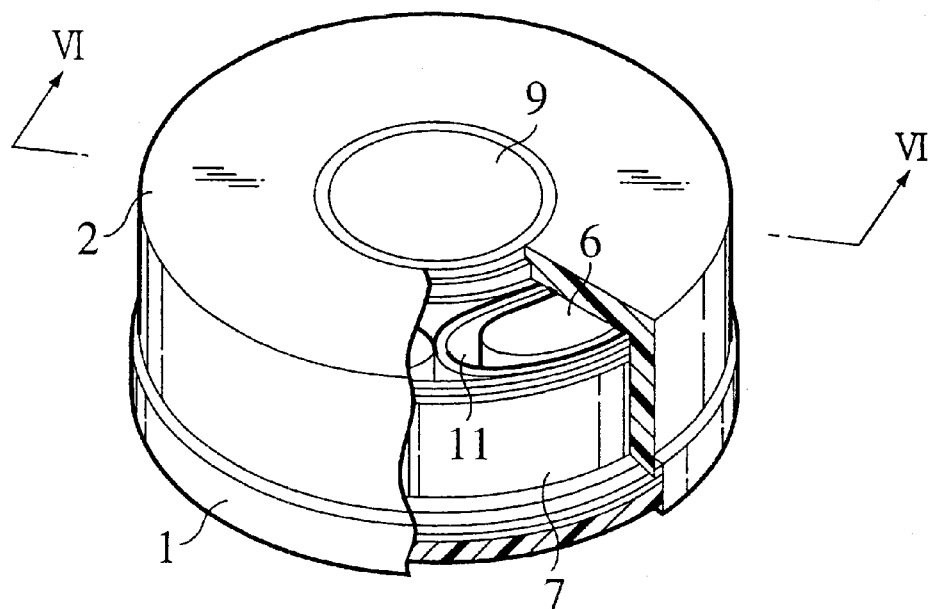
FIG. 5 is a cutaway perspective view of an electrical connecting device.
Figure 6:
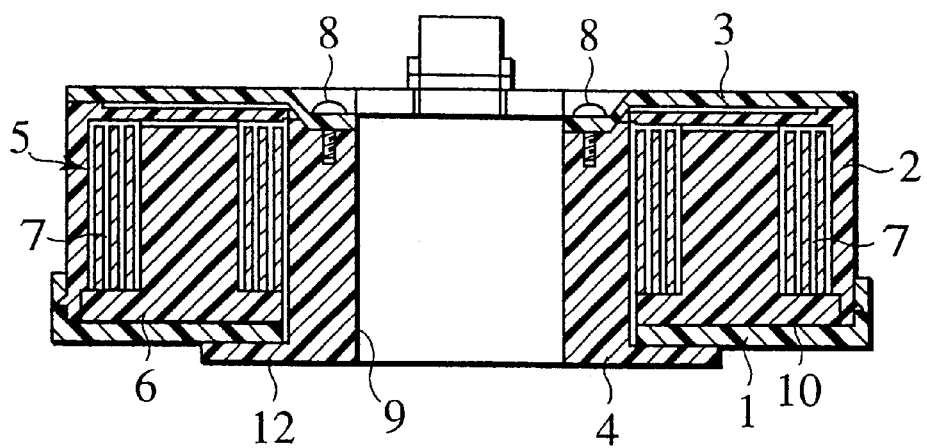
FIG. 6 is a sectional view taken on line VI—VI of FIG. 5.

FIG. 5 is a cutaway perspective view of an electrical connecting device, and FIG. 6 is a sectional view taken on line VI—VI of FIG. 5. In FIG. 5, the upper cover 3 is not illustrated.

As shown in FIGS. 5 and 6, the electrical connecting device is composed of a fixed body comprising an under cover 1 and a cover 2, which are fitted to a bearing of a steering shaft; a rotating body comprising an upper cover 3 and a rotator 4, which can be freely rotated coaxially to this fixed body; a carrier 6 which can be freely rotated inside a cable accommodating room 5 made by the undercover 1, the cover 2 and the rotator 4; and a flat cable 7 which is spirally arranged inside the cable accommodating room 5 and along the internal and external circumferences of the carrier 6 and can be freely moved.

<Structure of the Under Cover and the Cover>

As shown in FIG. 6, the under cover 1 and the cover 2 constituting the fixed body make, inside them, a ring-form cavity as the cable accommodating room 5. The cable accommodating room 5 accommodates the flat cable 7, which will be more specifically described later. The cable accommodating room 5 accommodates the carrier 6 for winding up and winding back the flat cable 7 smoothly in such a manner that the carrier 6 can be freely rotated.

The carrier 6 is a ring body having a flange 10 at its bottom. The carrier 6 has, at its one portion, a cut portion 11. The flat cable 7 which is spirally arranged along the internal circumference of the carrier 6 is pulled out from the cut portion 11 to the side of the external circumference thereof and is then spirally arranged in the same manner, so that the winding-up and winding-back of the flat cable 7 can be made smooth.

<Structure of the Upper Cover and the Rotator>

As shown in FIGS. 5 and 6, the upper cover 3 and the rotator 4 constituting the rotating body are arranged coaxially to the under cover 1 and the cover 2, and fitted to a non-illustrated steering wheel so as to be rotated with the steering wheel. The rotator 4 is a cylinder having a flange 12 at its bottom, and is press-fitted to a boss hole 9 wherein a non-illustrated steering shaft is made at the center thereof. As shown in FIG. 6, the upper cover 3 is disposed on the cover 2, and is fixed to the rotator 4 with screws 8.

<Structure of the Flat Cable>

Figure 7:
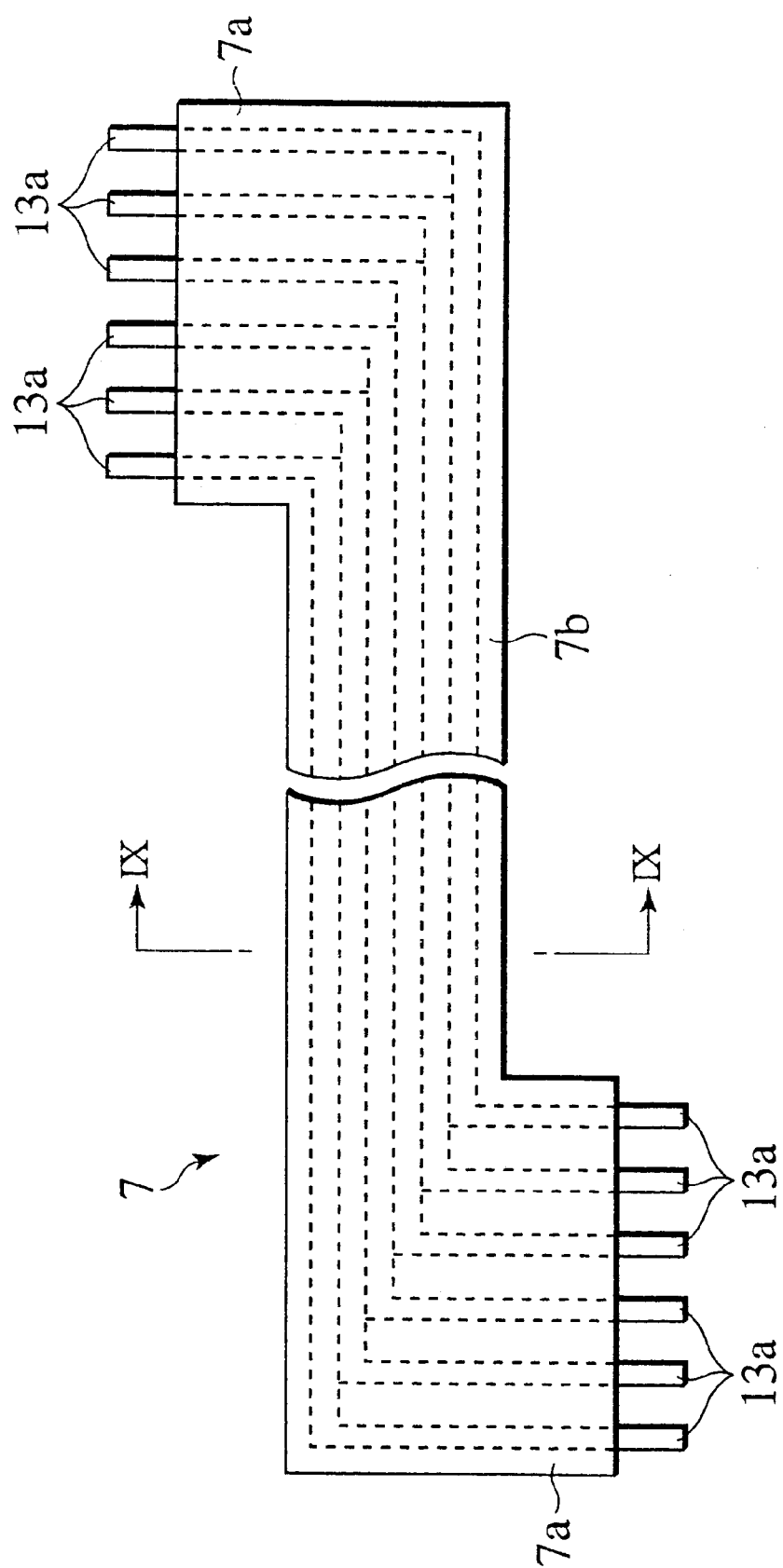
FIG. 7 is a plan view of a flat cable of the present invention.
Figure 8:
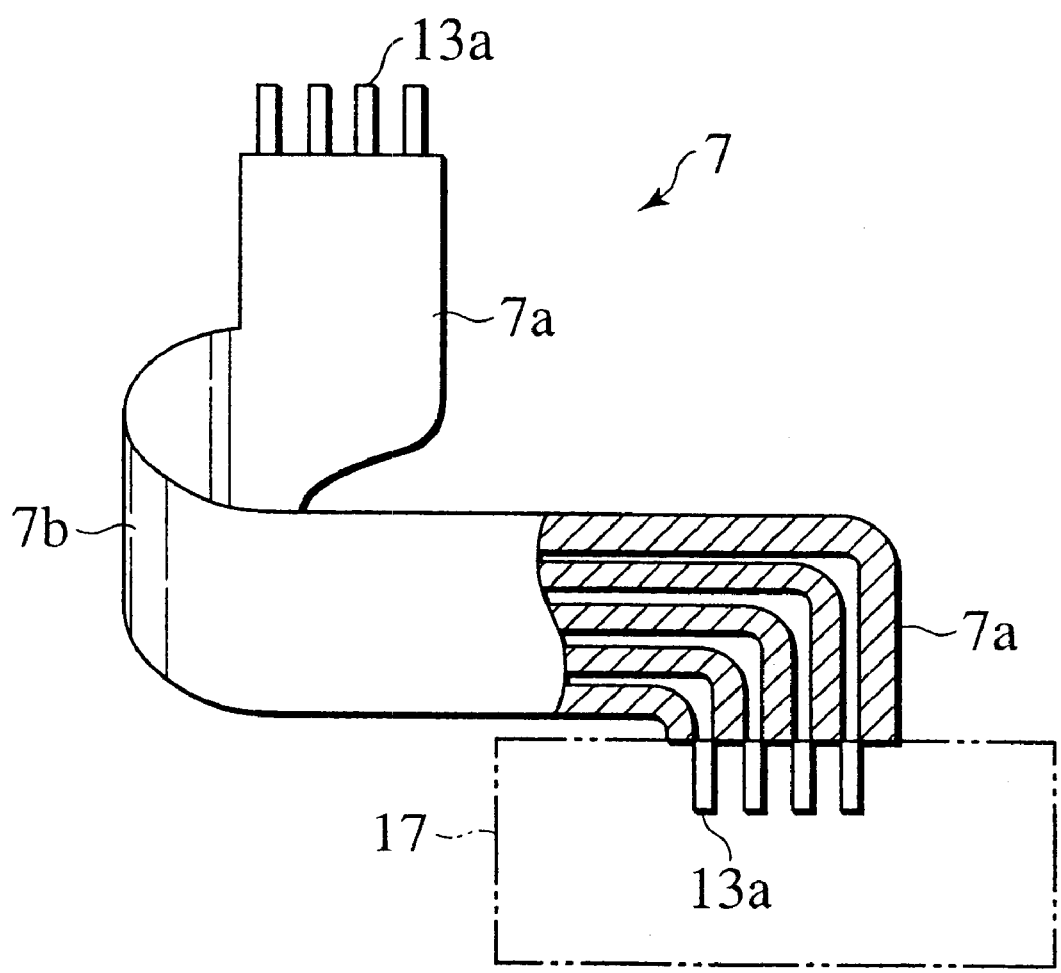
FIG. 8 is a perspective view of the flat cable of the present invention.

As shown in FIGS. 7–9, the structure of the flat cable 7 is as follows: plural conductor strips 13, which are made by plating and etching processes, are put together in two or more layers in such a manner that the conductor strips 13 in the respective layers are not electrically connected; and the layered conductor strips 13 are sandwiched between insulating films 14.

The following will more specifically describe the structure of the flat cable 7. As shown in FIG. 9, an insulating film adhesive layer 15 is formed on each of upper and lower flexible insulating films 14, which are made of polyester, polyimide or the like. The conductor strips 13 made of soft copper, hard copper, beryllium copper or the like are made on the insulating film adhesive layer 15 by plating and etching processes. Only both end portions 7a and 7a of the strips are bent in an "L"-shaped form, and the other portions are formed in a straight line form. The resultant products are bonded to each other, through an inside insulating film 14, with layers of an adhesive agent 16 so that the flat cable is formed.

As shown in FIG. 9, the upper conductor strips 13 and the lower conductor strips 13, which are layered through the insulating film 14, are alternately arranged. Besides, the both end portions 7a are bent in an "L"-shaped form and the other portions are in a straight line form. An end portion 13a of each of the bent conductor strips 13 is an external connecting terminal which is connected to an partner connector 17. The interval between the arranged conductor strips 13 in the end portion 7a of the bent flat cable 13 is made wider than the interval between the arranged conductor strips in the other portions.

In the electrically connecting device having the above-mentioned structure, the steering wheel is rotated so that the upper cover 3 and the rotator 4 are also rotated. As a result, the flat cable wherein one end is fixed to the rotator 4 and the other end is fixed to the under cover 1 and the cover 2 is forwarded out or pulled back toward either of both sides of the carrier 6. In this way, there does not arise a problem that the flat cable 7 is pulled by rotating the steering wheel so that the cable 7 is cut.

In the flat cable 7 having the above-mentioned structure, the conductor strips 13 are formed by plating and etching processes and the conductor strips 13 are put together into two or more layers so that the conductor strips 13 are not electrically connected. The layered conductor strips 13 are sandwiched between the insulating films 14 so as to be made multilayered. Therefore, as compared with flat cables having a structure wherein rolled copper foil is merely sandwiched between base films, the shape of the conductor strips 13 can be more freely varied and the shape of the conductor strips can be made more complicated in the present embodiment. Moreover, the flexibility of the flat cable 7 is as good as flexible printed-wiring boards.

As shown in FIGS. 7 and 8, by bending the end portions of the conductor strips 13, the flat cable 7 can be directly connected to the partner connector 17 without use of buss bars made into an "L"-shaped form or the like form.

Since the conductor 13 can be freely made into various shapes, the interval between the arranged conductor strips 13 in the bent end portions 7*a* can be made wider than that in the other portions. Thus, no buss bars are necessary. It is also possible to make the width of a flexible mobile portion 7*a* accommodated in a restricted space narrow and make the width of the end portions 7*a* (that is, the external connecting terminals) wide.

The present invention is not limited to the above-mentioned embodiment, and can be modified into various embodiments. Therefore, the modification of the present invention for a second embodiment will be explained hereinbelow.

For example, as shown in FIG. 10, a solder resist 18 is screen-printed to cover conductor strips 13. In this way, a flat cable 7 may be formed. That is, an insulating film adhesive layer 15 is formed on an insulating film 14. The conductor strips 13 made of soft copper, hard copper, beryllium copper or the like are made on the insulating film adhesive layer 15 by plating and etching processes. Only both end portions 7*a* of the strips are bent in an "L"-shaped form, and the other portions are formed in a straight line form. Thereafter, a solder resist 18 is screen-printed to cover the conductor strips 13. In this way, a solder resist layer 18 is formed.

As described above, by screen-printing the solder resist 18 to cover the conductor strips 13, the thickness of the cable itself can be made thin. Accordingly, the industrial value of the flat cable 7, which is required to be accommodated in a restricted space, becomes large.

The entire contents of Japanese Patent Application P11-315976 (filed Nov. 5, 1999) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A flat cable for electrically connecting a fixed body and a rotating body which can be freely rotated coaxially to the fixed body, comprising:

a first insulating film;

a first set of separate plated conductor strips disposed on the first insulating film;

a second insulating film;

a second set of separate plated conductor strips disposed on the second insulating film; and the first and second sets of separate plated conductor strips sandwiched between the first and second insulating films to form multiple layers, wherein:

the first set of separate plated conductor strips on the first insulating film and the second set of separate plated conductor strips on the second insulating film are layered to be electrically separated from each other;

at least one end portion of at least one strip of the first and second separated plated conductor strips is bent; and the interval between the arranged conductor strips in the bent end portion is wider than the interval between the arranged conductor strips in the other portions in the flat cable.

2. A flat cable for electrically connecting a fixed body and a rotating body which can be freely rotated coaxially to this fixed body, comprising:

an insulating film having a first and a second surfaces;

a first set of separate plated conductor strips disposed on the first surface;

a second set of separate plated conductor strips disposed on the second surface; and screen-printed solder resist layers on the first and the second surfaces of the insulating film to cover the first and the second sets of separate plated conductor strips, wherein at least one end portion of each of the conductor strips is bent and the interval between the arranged conductor strips in the bent end portion is wider than the interval between the arranged conductor strips in the other portions in the flat cable.

* * * * *